No. 730,937. PATENTED JUNE 16, 1903.
E. LOHMANN.
PHOTOGRAPHIC LENS SYSTEM.
APPLICATION FILED NOV. 8, 1902.
NO MODEL.
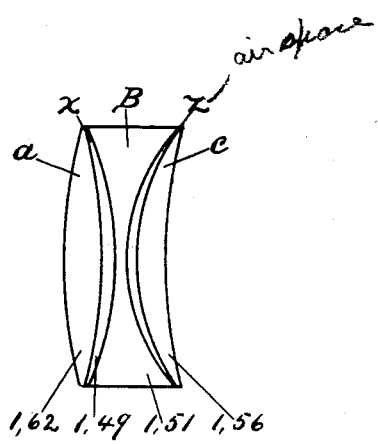
Witnesses
Osborn Wilson
Frazer E. Wilson
Inventor
Edwin Lohmann No. 730,937.

Patented June 16, 1903.

UNITED STATES PATENT OFFICE.

EDWIN LOHMANN, OF GREENVILLE, OHIO.

PHOTOGRAPHIC LENS SYSTEM.

SPECIFICATION forming part of Letters Patent No. 730,937, dated June 16, 1903.

Application filed November 8, 1902. Serial No. 130,507. (No model.)

*To all whom it may concern:*

Be it known that I, EDWIN LOHMANN, a citizen of the United States, residing at Greenville, in the county of Darke and State of Ohio, have invented a new and useful Improvement in Lens Systems for Photographic Purposes, of which the following is a specification.

The object of the present invention is to shorten the relative focal length of photographic objectives, while maintaining a satisfactory astigmatic, spheric, and chromatic correction.

The drawing herewith is a longitudinal cross-section showing an objective embodying the present invention.

The plan of the present invention is essentially that contained in my Letters Patent No. 711,985, with the exception that one of the thin positive meniscus lenses there shown is replaced in the present invention by an air-space Z. This alteration permits the use of an exceptionally light glass for the biconcave lens B in the annexed drawing, for as the biconcave lens B is inclosed on one side by a glass of lower refractive power and on the other by an air-space spherical correction is accomplished at both its curves, and its refractive power may be therefore considerably lower than has hitherto been successfully employed in photographic-lens construction. The relative focal length is thus reduced and greater brilliancy of the image obtained.

The equalization of the anastigmatic and spherical corrections due to the thin positive meniscus lenses in the before-mentioned Letters Patent is maintained in the present invention, the air-space Z and the inclosed positive meniscus lens X of the present invention being of relatively small thickness, thereby obtaining the greatest possible equality in the axial distances of the points of astigmatic and spherical correction in the two pairs of opposing curves.

The indices given in the annexed drawing are those preferably employed. Slight variations are advisable, however, for certain purposes.

In the present invention the biconvex lens $a$ has the highest refractive power, (1.62,) the positive meniscus lens C the next highest refractive power, (1.56,) the biconcave lens B has the next highest refractive power, (1.51,) and the positive meniscus lens X has the lowest refractive power, (1.49.)

Two of the described objectives may be employed to form a photographic doublet.

What I claim is—

A quadruple-lens system composed of an outer biconvex lens of highest refractive power, an outer positive meniscus lens of next highest refractive power, an intermediate biconcave lens of next highest refractive power, the outer biconvex and outer positive meniscus lenses being separated from the intermediate biconcave lens respectively, by a positive meniscus lens of lowest refractive power and a positive meniscus air-space, substantially as shown and described.

EDWIN LOHMANN.

Witnesses:
F. E. WILSON,
OSBORN WILSON.